(12) United States Patent
Lee et al.

(10) Patent No.: US 9,280,164 B2
(45) Date of Patent: Mar. 8, 2016

(54) SWITCHING POWER-SUPPLY DEVICE AND METHOD FOR MANUFACTURING SWITCHING POWER-SUPPLY DEVICE

(71) Applicant: SANKEN ELECTRIC CO., LTD., Niiza-shi, Saitama (JP)

(72) Inventors: Jung Soo Lee, Saitama (JP); Satoshi Nakamoto, Saitama (JP); Chie Isshi, Saitama (JP); Masaru Nakamura, Saitama (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 506 days.

(21) Appl. No.: 13/744,798

(22) Filed: Jan. 18, 2013

(65) Prior Publication Data

US 2014/0203791 A1   Jul. 24, 2014

(51) Int. Cl.
*H02M 3/156* (2006.01)
*G05F 1/46* (2006.01)
*H02M 1/00* (2007.01)

(52) U.S. Cl.
CPC ............... *G05F 1/468* (2013.01); *H02M 3/156* (2013.01); *H02M 2001/0025* (2013.01); *H02M 2001/0032* (2013.01)

(58) Field of Classification Search
CPC ... H02M 3/156; H02M 3/1563; H02M 3/158; H02M 2003/1566; G05F 1/46; G05F 1/468
USPC ................................................. 323/282–290
See application file for complete search history.

(56) References Cited

U.S. PATENT DOCUMENTS

| | | | | |
|---|---|---|---|---|
| 5,438,499 | A * | 8/1995 | Bonte et al. | 363/21.16 |
| 8,159,843 | B2 * | 4/2012 | Lund et al. | 363/56.01 |
| 8,618,783 | B2 * | 12/2013 | Oki | 323/285 |
| 2007/0120547 | A1 * | 5/2007 | Tateishi et al. | 323/282 |
| 2010/0134085 | A1 * | 6/2010 | Nishida | 323/285 |
| 2010/0320979 | A1 * | 12/2010 | Lu et al. | 323/282 |
| 2011/0254462 | A1 * | 10/2011 | Ruan | H05B 33/0815 315/291 |

* cited by examiner

*Primary Examiner* — Jessica Han
(74) *Attorney, Agent, or Firm* — Banner & Witcoff, Ltd.

(57) ABSTRACT

A switching power-supply device includes a switching element; an output circuit; a feedback signal generation circuit; a control circuit that drives the switching element, based on the feedback signal, and controls the voltage of the power-supply output; a correction circuit that corrects a signal level of the feedback signal, wherein the control circuit comprises: an oscillation circuit that generates an on-trigger signal; a current detection circuit that generates a current detection signal; a difference detection circuit that generates a difference detection signal; a comparison circuit that generates an off-trigger signal, based on the current detection signal and the difference detection signal; and a first load detection circuit that controls an operation of the correction circuit, based on the current detection signal, and wherein the control circuit changes a setting voltage of the power-supply output, according to the signal level of the feedback signal.

18 Claims, 11 Drawing Sheets

SWITCHING POWER-SUPPLY DEVICE AND METHOD FOR MANUFACTURING SWITCHING POWER-SUPPLY DEVICE

TECHNICAL FIELD

The present invention relates to a switching power-supply device and a method of controlling the switching power-supply device.

BACKGROUND ART

In recent years, lower power consumption of an electric instrument is required. According to the request, as a power-supply device that feeds power to circuits of respective units of the electric instrument, a switching power-supply device has been known which is configured to stop the power feeding to a circuit that is being not used at a standby state of the electric instrument and also to lower a voltage of the power that is fed to a circuit being used (for example, U.S. Pat. No. 8,054,653B2).

The switching power-supply device disclosed in the above Patent Document includes an AC/DC conversion unit, a switching element to which direct current power generated by the AC/DC conversion unit is input, a DC/AC conversion unit that generates a power-supply output of a desired voltage by a switching operation of the switching element, and a control unit that controls the switching operation of the switching element. The control unit detects a current flowing to a load and increases the voltage of the power-supply output at a heavy load where the current is relatively high and lowers the voltage of the power-supply output at a light load where the current is relatively low such as standby state of the instrument.

SUMMARY

According to the switching power-supply device described in the Patent Document, in order to detect the current flowing to the load, it is required to separately provide a cable or connector connecting an output-side of the DC/DC conversion unit and the control unit, so that the number of parts is increased. Thereby, the cost may be increased, and it is difficult to implement the miniaturization thereof. Also, a resistance is generally used to detect the current and the current is detected based on a voltage drop at the resistance. However, when detecting the current flowing to the load, the power that is consumed by the resistance is relatively high.

One aspect of the disclosure has been made with considering the above situations, and an object thereof is to provide a switching power-supply device capable of reducing power consumption of an electric instrument.

In view of the above object, a switching power-supply device is provided, which comprises: a switching element to which direct current power is input; an output circuit that generates a power-supply output of direct current to be supplied to a load from power that is transmitted according to a switching operation of the switching element; a feedback signal generation circuit that generates a feedback signal from a voltage of the power-supply output; and a control circuit that drives the switching element, based on the feedback signal, and controls the voltage of the power-supply output, wherein the feedback signal generation circuit comprises a correction circuit that corrects a signal level of the feedback signal, wherein the control circuit comprises: an oscillation circuit that generates an on-trigger signal to turn on the switching element; a current detection circuit that generates a current detection signal according to a current flowing through the switching element; an difference detection circuit that generates an difference detection signal according to a difference between the feedback signal and a reference voltage; a comparison circuit that generates an off-trigger signal to turn off the switching element, based on the current detection signal and the difference detection signal; and a first load detection circuit that controls an operation of the correction circuit, based on one of the current detection signal and the difference detection signal, and wherein the control circuit changes a setting voltage of the power-supply output, according to the signal level of the feedback signal.

Also, in view of the above object, a method of controlling a switching power-supply device is provided, which generates a power-supply output of direct current from power of direct current, which is input to a switching element according to a switching operation of the switching element, and that drives the switching element, based on a feedback signal that is generated from a voltage of the power-supply output, to thus control a voltage of the power-supply output, the method comprises: correcting a signal level of the feedback signal, based one of on an difference between a current flowing through the switching element and the feedback signal and a reference voltage, and changing a setting voltage of the power-supply output according to the signal level of the feedback signal.

According to one aspect of the present invention, it is possible to change a voltage of the power-supply output depending on a load, thereby reducing the power consumption of an electric instrument.

DESCRIPTION OF PREFERRED ILLUSTRATIVE EMBODIMENTS

Figure 1:
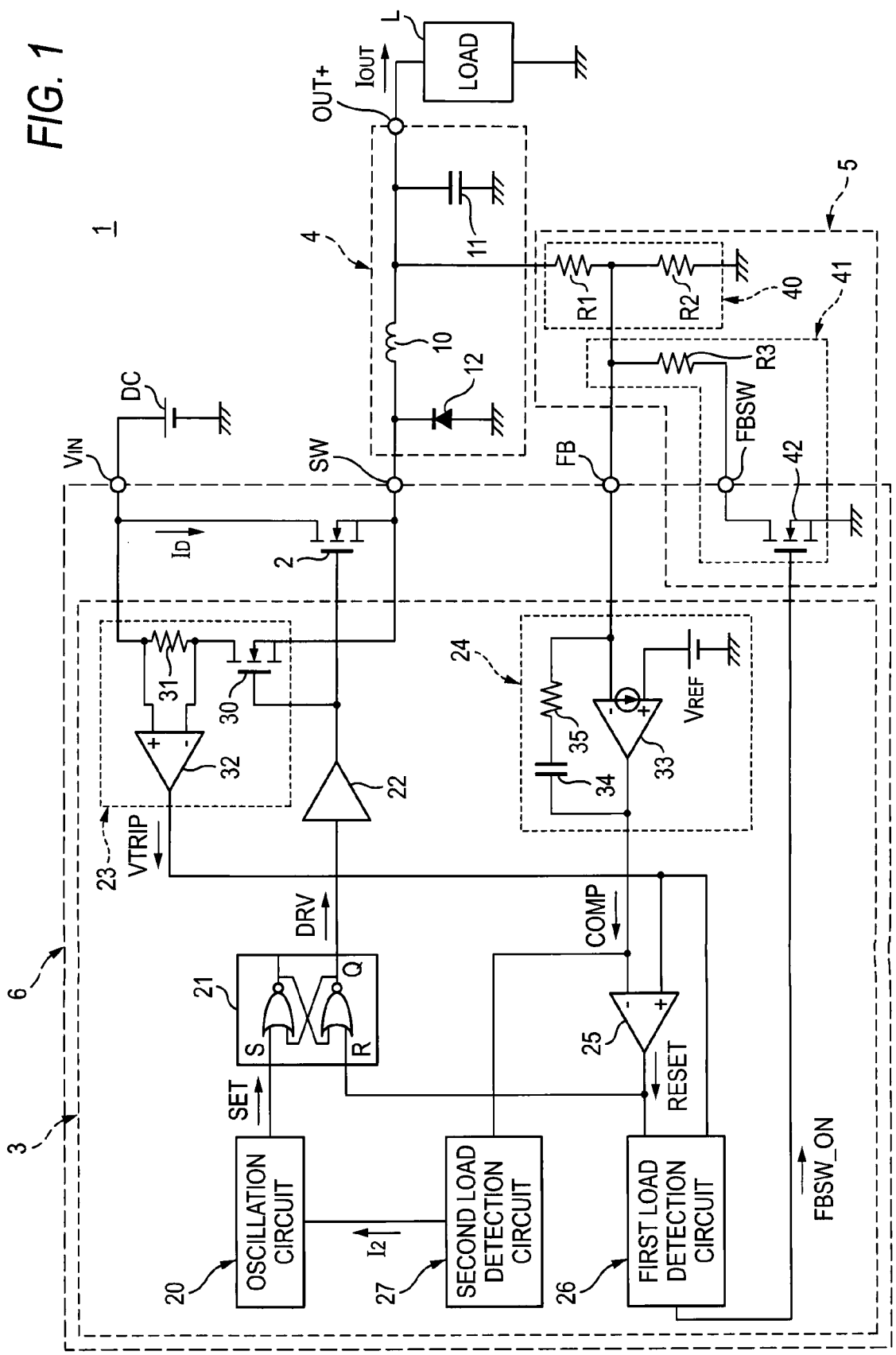
FIG. 1 is a block diagram illustrating an example of a configuration of a switching power-supply device for illustrating an exemplary illustrative embodiment.

FIG. 1 illustrates an example of a configuration of a switching power-supply device for illustrating an exemplary illustrative embodiment.

A switching power-supply device 1 shown in FIG. 1 has a switching element 2, a control circuit 3 that drives the switching element 2, an output circuit 4 that generates a power-supply output of direct current to be supplied to a load L and a feedback signal generation circuit 5 that generates a feedback signal so as to stabilize a voltage of the power-supply output.

In this example, the switching element 2 is an n-channel MOSFET (Metal-Oxide-Semiconductor Field-Effect Transistor) and is integrated in the same package 6 as the control circuit 3 that is configured by a semiconductor integrated circuit. A drain of the switching element 2 is connected to a $V_{IN}$ terminal of the package 6 to which direct current power from a direct current power-supply DC is input, and a source of the switching element 2 is connected to an SW terminal of the package 6.

The output circuit 4 has a low-pass filter circuit, which is configured by an inductor 10 and a capacitor 11, and a diode 12. The inductor 10 is provided between the SW terminal of the package 6 and an OUT+ terminal at a positive terminal output-side of the output circuit 4. The capacitor 11 is provided between the OUT+ terminal of the output circuit 4 and a ground GND. Also, the diode 12 is provided between the SW terminal of the package 6 and the ground GND, and a cathode thereof is connected to the SW terminal of the package 6.

During an on-time period of the switching element 2, a current flows from the direct current power-supply DC to the output circuit 4 through the switching element 2, and energy corresponding to the current is accumulated in the inductor 10. During an off-time period of the switching element 2, a regenerative current of the inductor 10 based on the energy accumulated during the on-time period flows in the output circuit 4. The capacitor 11 is charged by the current flowing to the output circuit 4, and a voltage $V_{OUT}$ of the power-supply output is smoothed by the charging/discharging of the capacitor 11.

Although specifically described later, the feedback signal generation circuit 5 generates a feedback signal from the voltage $V_{OUT}$ of the power-supply output that is generated by the output circuit 4, and outputs the feedback signal to the control circuit 3.

The control circuit 3 periodically turns on and off the switching element 2 to perform PWM (Pulse Width Modulation) control of adjusting a duty ratio of an on-time period of the switching element 2 based on the feedback signal, thereby stabilizing the voltage $V_{OUT}$ of the power-supply output. In the below, the configuration of the control circuit 3 is described.

The control circuit 3 has an oscillation circuit 20, a PWM latch 21, a drive circuit 22, a current detection circuit 23, an difference detection circuit 24, a PWM comparator (comparison circuit) 25, a first load detection circuit 26 and a second load detection circuit 27.

The oscillation circuit 20 periodically outputs a set signal (on-trigger signal) SET for turning on the switching element 2 to the PWM latch 21.

The PWM latch 21 is configured by an SR flip-flop circuit. The set signal SET that is output from the oscillation circuit 20 is input to a set terminal S of the PWM latch 21. Then, the PWM latch 21 outputs a driving signal DRV from a non-inverting output terminal Q to the drive circuit 22 and drives a gate of the switching element 2 through the drive circuit 22. Accordingly, as the set signal SET is input to the PWM latch 21, the switching element 2 turns on.

The current detection circuit 23 outputs a current detection signal VTRIP, which corresponds to a drain current $I_D$ flowing to the switching element 2, to the PWM comparator 25 and the first load detection circuit 26. In this embodiment, the current detection circuit 23 includes a switching element for sense 30, a resistance 31 and an amplifier for sense 32. A drain of the switching element for sense 30 is connected to the $V_{IN}$ terminal of the package 6 via the resistance 31, and a source of the switching element for sense 30 is connected to the SW terminal of the package 6. A gate of the switching element for sense 30 is connected to the drive circuit 22. Accordingly, the switching element for sense 30 is driven by the PWM latch 21 via the drive circuit 22 and turns on-and-off in synchronization with the switching element 2. During an on-time period of the switching element for sense 30, the current flows through the resistance 31. At this time, the amplifier for sense 32 detects a voltage drop occurring at the resistance 31 and generates the current detection signal VTRIP.

The difference detection circuit 24 includes a differential amplifier 33 and also a capacitor 34 and a resistance 35, which are for phase compensation, and which are connected in series between an output terminal and an inverting input terminal of the differential amplifier 33. The inverting input terminal of the differential amplifier 33 is connected to an FB terminal of the package 6 and is input with the feedback signal from the feedback signal generation circuit 5. Also, a non-inverting input terminal of the differential amplifier 33 is applied with a reference voltage $V_{REF}$. The differential amplifier 33 amplifies a differential voltage between the feedback signal and the reference voltage $V_{REF}$ to generate an difference detection signal COMP and then outputs the difference detection signal COMP to the PWM comparator 25 and the second load detection circuit 27.

The current detection signal VTRIP that is output from the current detection circuit 23 is input to a non-inverting input terminal of the PWM comparator 25, and the difference detection signal COMP that is output from the difference detection circuit 24 is input to an inverting input terminal of the PWM comparator 25. The PWM comparator 25 compares the current detection signal VTRIP and the difference detection signal COMP. When the current detection signal VTRIP exceeds the difference detection signal COMP, the PWM comparator 25 outputs a reset signal (off-trigger signal) RESET for turning off the switching element 2 to the PWM latch 21. The reset signal RESET is input to a reset terminal R of the PWM latch 21. As the reset signal RESET is input to the PWM latch 21, the switching element 2 turns off. The reset signal RESET is also output to the first load detection circuit 26.

The control circuit 3 controls an on-width of the switching element 2, based on the current detection signal VTRIP and the difference detection signal COMP so that the lower the voltage $V_{OUT}$ of the power-supply output and the larger the difference detection signal COMP, the on-width is longer. Thereby, the voltage $V_{OUT}$ of the power-supply output is stabilized.

The feedback signal generation circuit 5 generating the feedback signal that is a basis of the difference detection signal COMP has a voltage-dividing circuit 40 and a correction circuit 41.

The voltage-dividing circuit 40 is provided between the OUT+ terminal of the output circuit 4 and the ground GND and includes a resistance R1 and a resistance R2, which are connected in series in corresponding order from the OUT+ terminal-side.

The correction circuit 41 is provided in parallel with the resistance R2 of the voltage-dividing circuit 40 and includes a correction resistance R3 and a switch 42 that are connected in series. In this embodiment, the switch 42 is an n-channel MOSFET and is integrated in the same package as the control circuit 3. A drain of the switch 42 is connected to the correction resistance R3 via an FBSW terminal of the package 6, and a source of the switch 42 is connected to the ground GND. A gate of the switch 42 is connected to the first load detection circuit 26.

A connection point of the resistance R1 and the resistance R2 is connected to the FB terminal of the package 6, and the voltage $V_{OUT}$ of the power-supply output is divided, so that a voltage to be applied to the resistance R2 is input to the FB terminal of the package 6 as a feedback signal. Here, while the switch 42 is being on, the resistance R2 and the resistance R3 are connected in parallel with each other and thus the voltage $V_{OUT}$ of the power-supply output is divided in accordance with a resistance ratio of the resistance R1 and a combined resistance of the resistance R2 and the resistance R3. On the other hand, a state where the switch 42 is being off is equivalent to a case where the resistance R3 is not provided, and the voltage $V_{OUT}$ of the power-supply output is divided in accordance with a resistance ratio of the resistance R1 and the resistance R2. Thereby, a signal level of the feedback signal is corrected.

The switch 42 is turned on-and-off by the first load detection circuit 26. The first load detection circuit 26 is turned on-and-off the switch 42 of the correction circuit 41, based on the current detection signal VTRIP, thereby controlling an operation of the correction circuit 41.

Figure 2:
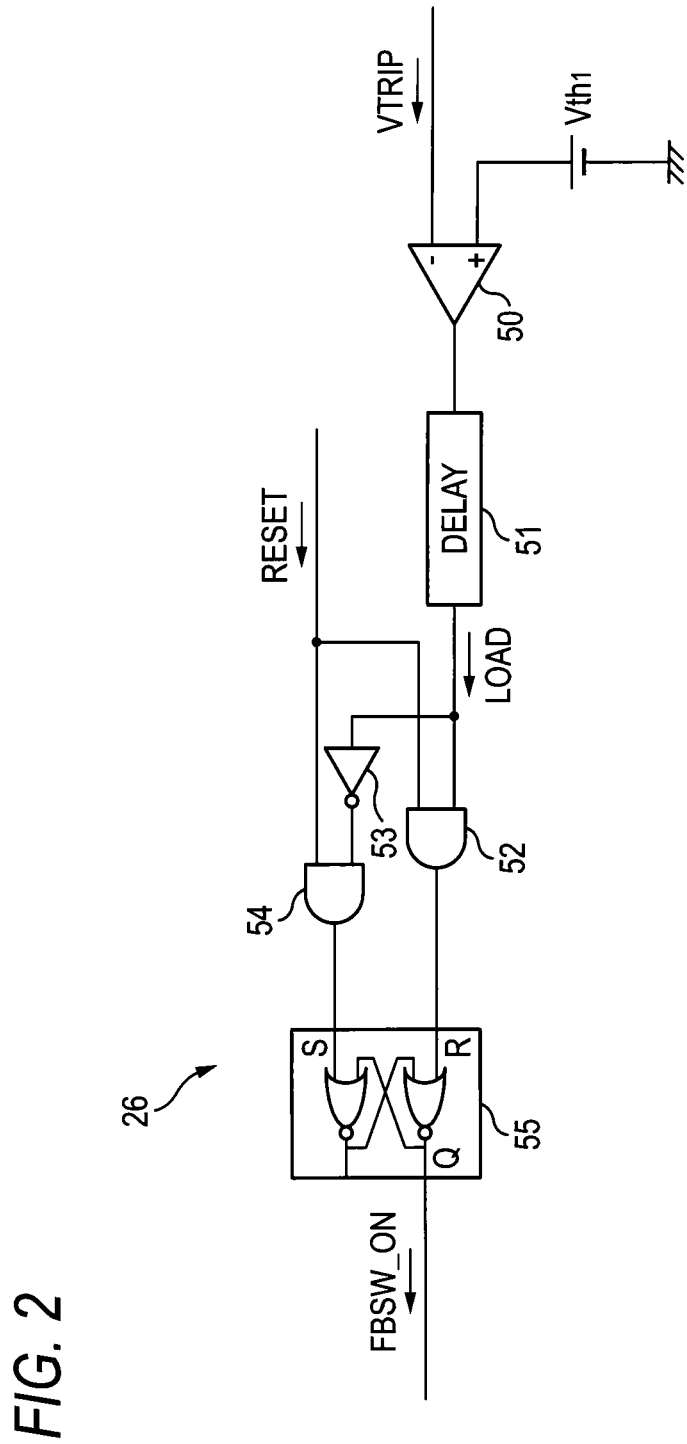
FIG. 2 is a block diagram of a first load detection circuit of the switching power-supply device shown in FIG. 1.

FIG. 2 illustrates a configuration of the first load detection circuit 26.

The first load detection circuit 26 includes a load detection comparator 50, a delay circuit 51, a first AND circuit 52, an inverter 53, a second AND circuit 54 and an SR flip-flop circuit 55.

An inverting input terminal of the load detection comparator 50 is input with the current detection signal VTRIP that is output from the current detection circuit 23. Also, a non-inverting input terminal of the load detection comparator 50 is applied with a first threshold voltage $V_{th1}$. The load detection comparator 50 compares the current detection signal VTRIP and the first threshold voltage $V_{th1}$ and generates a load detection signal Load of a HIGH level or LOW level.

The load detection signal LOAD that is generated by the load detection comparator 50 is input to one input terminal of the first AND circuit 52 via the delay circuit 51. The other input terminal of the first AND circuit 52 is input with the reset signal RESET that is output from the PWM comparator 25.

Also, the load detection signal LOAD that is generated by the load detection comparator 50 passes to the delay circuit 51, is further inverted through the inverter 53 and is then input to one input terminal of the second AND circuit 54. The other input terminal of the second AND circuit 54 is input with the reset signal RESET that is output from the PWM comparator 25.

An output signal of the first AND circuit 52 is input to a reset terminal R of the SR flip-flop circuit 55, and an output signal of the second AND circuit 54 is input to a set terminal R of the SR flip-flop circuit 55. Then, the SR flip-flop circuit 55 outputs a driving signal FBSW_ON from a non-inverting output terminal Q to the correction circuit 41 to drive the gate of the switch 42.

Figure 3:
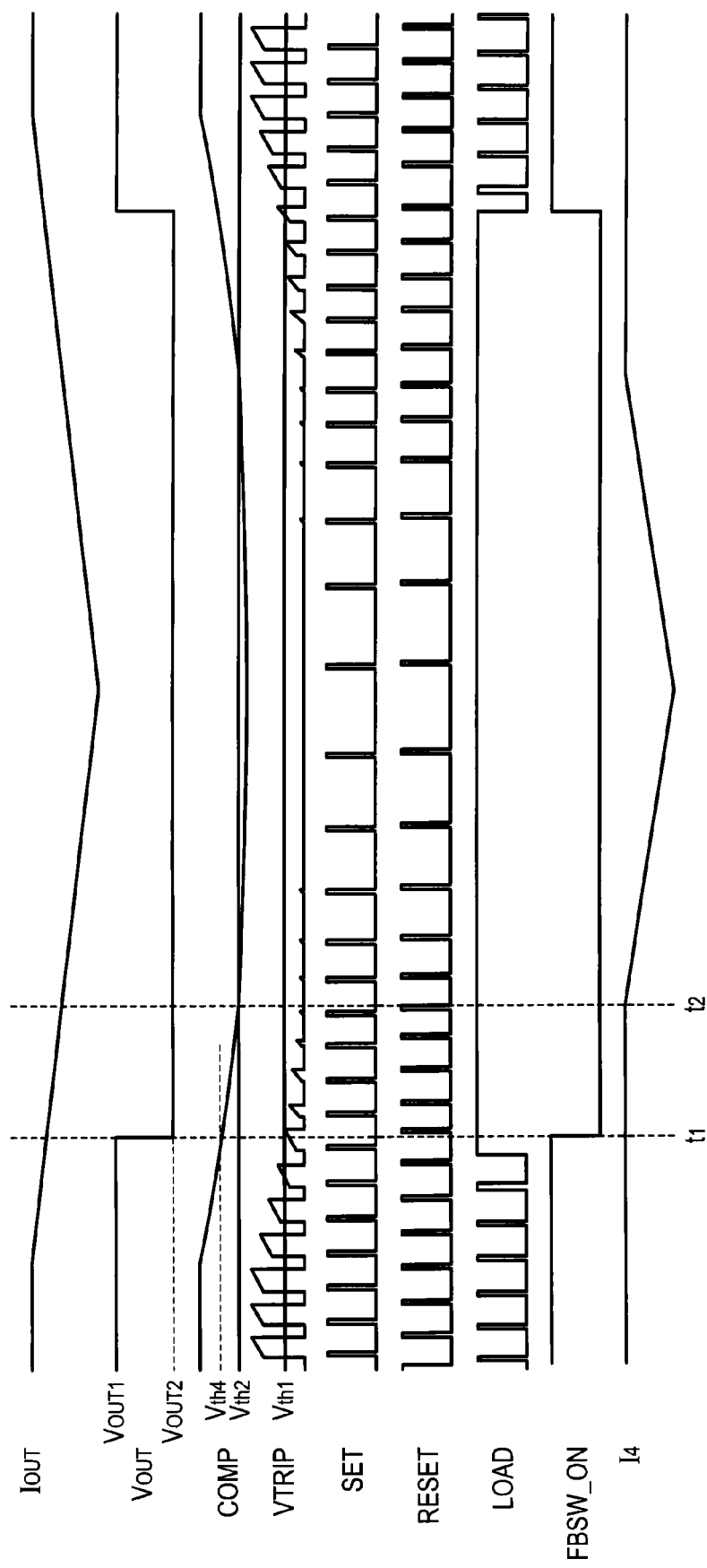
FIG. 3 is a waveform diagram illustrating operations of respective units of the switching power-supply device shown in FIG. 1.

FIG. 3 illustrates operations of the respective units of the switching power-supply device 1.

At a heavy load state where the current $I_{OUT}$ of the power-supply output is relatively high, the load detection signal LOAD is set to be a LOW level in a time period for which the current detection signal VTRIP exceeds the first threshold voltage $V_{th1}$ and the reset signal RESET is input to the first AND circuit 52 and the second AND circuit 54 of the first load detection circuit 26. Therefore, a signal of a HIGH level is input to the set terminal S of the SR flip-flop circuit 55 from the second AND circuit 54. Thereby, the driving signal FBSW_ON that is output from the SR flip-flop circuit 55 becomes a HIGH level and the switch 42 of the correction circuit 41 turns on.

At a state where the switch 42 is being on, the resistance R2 of the voltage-dividing circuit 40 and the resistance R3 of the correction circuit 41 are connected in parallel. Therefore, the feedback signal $V_{FB}$ is obtained by dividing the voltage $V_{OUT}$ of the power-supply output in accordance with the resistance ratio of the resistance R1 and the combined resistance of the resistance R2 and the resistance R3 and is expressed by an equation (1).

[equation 1]

$$V_{FB} = V_{OUT} \cdot \frac{\left(\frac{R_2 \cdot R_3}{R_2 + R_3}\right)}{R_1 + \left(\frac{R_2 \cdot R_3}{R_2 + R_3}\right)} \qquad (1)$$
$$= V_{OUT} \cdot \frac{R_2 \cdot R_3}{R_1 \cdot R_2 + R_1 \cdot R_3 + R_2 \cdot R_3}$$

Meanwhile, in the equation (1), $R_1$ indicates a resistance value of the resistance R1, $R_2$ indicates a resistance value of the resistance R2 and $R_3$ indicates a resistance value of the resistance R3.

Since the control circuit 3 performs the control so that the feedback signal $V_{FB}$ becomes the reference voltage $V_{REF}$, a setting voltage $V_{OUT1}$ of the power-supply output at this time is expressed by an equation (2).

[equation 2]

$$V_{OUT1} = V_{REF} \cdot \frac{R_1 \cdot R_2 + R_1 \cdot R_3 + R_2 \cdot R_3}{R_2 \cdot R_3} \qquad (2)$$

Subsequently, operations of the respective units of the switching power-supply device 1 that are performed at a light load where the current $I_{OUT}$ of the power-supply output is relatively small are described.

When a state where the current $I_{OUT}$ of the power-supply output of the output circuit 4 becomes small and the current detection signal VTRIP is below the first threshold voltage $V_{th1}$ continues, the load detection signal LOAD is kept at the HIGH level. After that, a HIGH-level signal is input to the reset terminal R of the SR flip-flop circuit 55 from the first AND circuit 52 at timing t1 at which the reset signal RESET output from the PWM comparator 25 is switched from a LOW level to a HIGH level. Thereby, the driving signal FBSW_ON that is output from the SR flip-flop circuit 55 is switched from the HIGH level to a LOW level, and the switch 42 of the correction circuit 41 turns off.

The state where the switch 42 is being off is equivalent to a case where the resistance R3 is not provided. Therefore, the feedback signal is obtained by dividing the voltage $V_{OUT}$ of the power-supply output in accordance with the resistance ratio of the resistance R1 and the resistance R2 and is expressed by an equation (3).

[equation 3]

$$V_{FB} = V_{OUT} \cdot \frac{R_2}{R_1 + R_2} \qquad (3)$$

Since the control circuit 3 performs the control so that the feedback signal $V_{FB}$ becomes the reference voltage $V_{REF}$, a setting voltage $V_{OUT2}$ of the power-supply output at this time is expressed by an equation (4).

[equation 4]

$$V_{OUT2} = V_{REF} \cdot \frac{R_1 + R_2}{R_2} \qquad (4)$$

As shown with the equations (1) to (4), as compared to the heavy load, at the light load, the voltage-dividing ratio of the voltage $V_{OUT}$ of the power-supply output is increased, the signal level of the feedback signal $V_{FB}$ is boosted, and the setting voltage of the power-supply output is changed from the first voltage $V_{OUT1}$ to the second voltage $V_{OUT2}$ lower than the first voltage $V_{OUT1}$ ($V_{OUT1}>V_{OUT2}$). Thereby, the voltage $V_{OUT}$ of the power-supply output is lowered and the power that is consumed at the load L is reduced.

Also, the switching power-supply device 1 lowers a switching frequency at the light load, from a standpoint of further reducing the power consumption at the light load. In the below, an operation of lowering the switching frequency is described.

Figure 4:
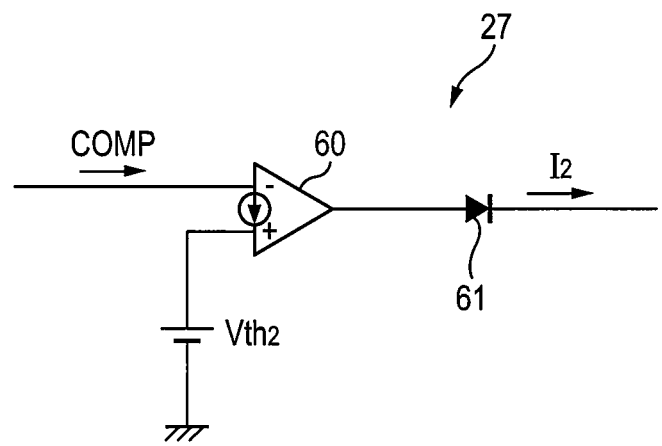
FIG. 4 is a block diagram of a second load detection circuit of the switching power-supply device shown in FIG. 1.
Figure 5:
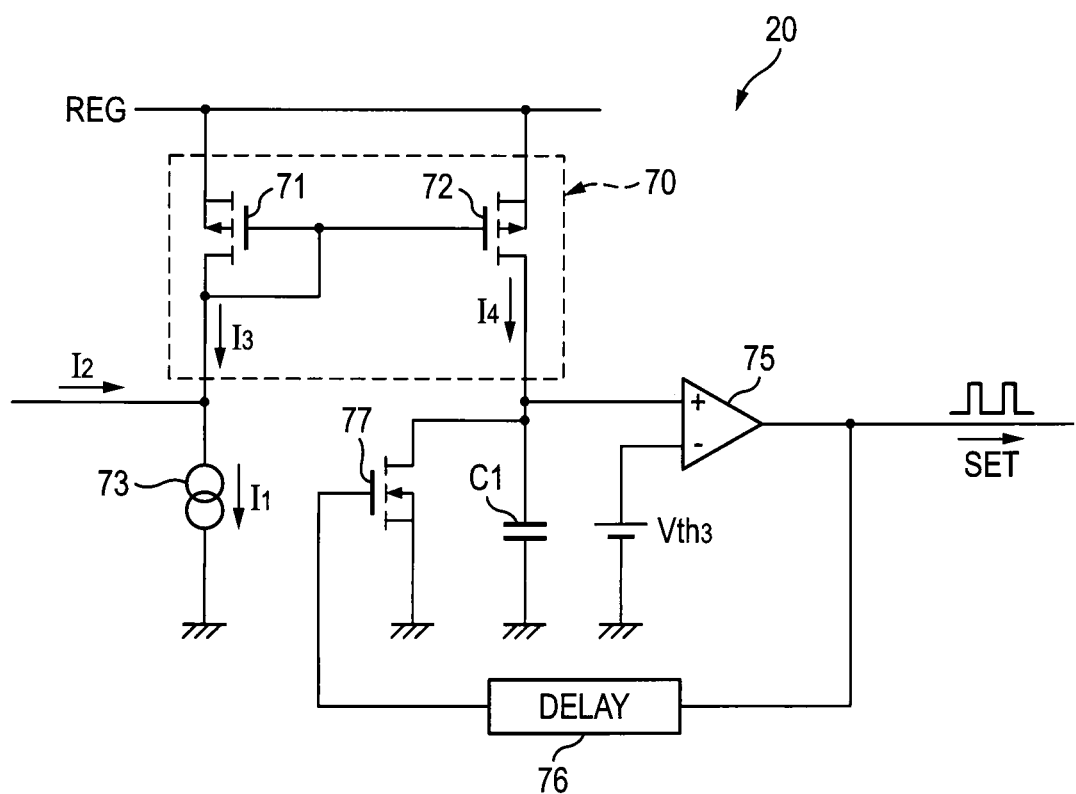
FIG. 5 is a block diagram of an oscillation circuit of the switching power-supply device shown in FIG. 1.

FIG. 4 illustrates a configuration of the second load detection circuit 27 and FIG. 5 illustrates a configuration of the oscillation circuit 20.

The second load detection circuit 27 includes a transconductance amplifier 60 and a diode 61. An inverting input terminal of the transconductance amplifier 60 is input with the difference detection signal COMP that is output from the difference detection circuit 24, and a non-inverting input terminal of the transconductance amplifier 60 is applied with a second threshold voltage $V_{th2}$. When the difference detection signal COMP is below the second threshold voltage $V_{th2}$, the transconductance amplifier 60 outputs a current $I_2$ (frequency control signal), which is proportional to a differential voltage between the difference detection signal COMP and the second threshold voltage $V_{th2}$, to the oscillation circuit 20 via the diode 61.

The oscillation circuit 20 includes a current mirror circuit 70 configured by p-channel MOSFETs 71, 72, a constant current source 73, a capacitor C1, a comparator 75, a delay circuit 76 and a switch 77 configured by an n-channel MOSFET.

Respective sources of the MOSFETs 71, 72 are connected to a common constant voltage source REG. A drain of the MOSFET 71 at an input-side of the current mirror circuit 70 is connected to the constant current source 73. Also, a drain of the MOSFET 72 at an output-side of the current mirror circuit 70 is connected to the capacitor C1.

The current $I_2$ that is output from the second load detection circuit 27 is input to a midpoint between the input-side MOSFET 71 and the constant current source 73. When the current flowing through the constant current source 73 is denoted with $I_1$, a current $I_3(=I_1-I_2)$ flows through the MOSFET 71 and a mirror current $I_4=I_3(=I_1-I_2)$ flows through the output-side MOSFET 72. The capacitor C1 is charged by the current $I_4$ flowing through the MOSFET 72.

A non-inverting input terminal of the comparator 75 is input with a voltage between both ends of the capacitor C1 and an inverting input terminal of the comparator 75 is applied with a third threshold voltage $V_{th3}$. The comparator 75 compares the voltage between both ends of the capacitor C1 and the third threshold voltage $V_{th3}$. When the voltage between both ends of the capacitor C1 exceeds the third threshold voltage $V_{th3}$, the comparator 75 outputs the set signal SET to the switch 77 via the delay circuit 76. In the meantime, the set signal SET is also output to the PWM latch 21, as described above.

A drain of the switch 77 is connected to the capacitor C1, and a source of the switch 77 is connected to the ground GND, thereby forming a discharging circuit of the capacitor C1. The set signal SET that is output from the comparator 75 is input to the gate of the switch 77. As the set signal SET is input to the gate, the switch 77 turns on, so that the capacitor C1 is discharged.

The oscillation circuit 20 periodically outputs the set signal SET as the charging/discharging of the capacitor C1 is repeated.

Referring to FIG. 3, after timing $t_1$ at which the setting voltage of the power-supply output is switched from the first voltage $V_{OUT1}$ to the second voltage $V_{OUT2}$, the current $I_{OUT}$ flowing through the load L is further decreased. At timing $t_2$ at which the difference detection signal COMP input to the second load detection circuit 27 is below the second threshold voltage $V_{th2}$, the second load detection circuit 27 outputs the current $I_2$, which is proportional to the differential voltage between the difference detection signal COMP and the second threshold voltage $V_{th2}$, to the oscillation circuit 20. The current $I_2$ is expressed by an equation (5) where a transconductance of the transconductance amplifier 60 of the second load detection circuit 27 is denoted with Gm.

[equation 5]

$$I_2 = Gm \cdot (V_{th2} - \text{COMP}) \qquad (5)$$

Therefore, in the oscillation circuit 20, the current $I_4$ flowing through the output-side MOSFET 72 of the current mirror circuit 70 is expressed by an equation (6).

[equation 6]

$$\begin{aligned} I_4 &= I_1 - I_2 \\ &= I_1 - Gm \cdot (V_{th2} - \text{COMP}) \end{aligned} \qquad (6)$$

Since the capacitor C1 of the oscillation circuit 20 is charged by the current $I_4$, an output period (switching period) $T_{SW}$ of the set signal SET is expressed by an equation (7) where delay time of the delay circuit 76 is denoted with $T_{delay}$.

[equation 7]

$$T_{SW} = \frac{C_1 \cdot V_{th3}}{I_1 - Gm \cdot (V_{th2} - \text{COMP})} + T_{delay} \qquad (7)$$

Meanwhile, in the equation (7), $C_1$ indicates a capacitance of the capacitor C1.

The delay time $T_{delay}$ is minimum required time that is necessary to additionally supply the set signal SET to the PWM latch 21 and is extremely short such as several tens of ns in general. Therefore, in the equation (7), the switching period $T_{SW}$ can be approximated by an equation (8) while assuming that $T_{delay} \approx 0$.

[equation 8]

$$T_{SW} \approx \frac{C_1 \cdot V_{th3}}{I_1 - Gm \cdot (V_{th2} - \text{COMP})} \quad (8)$$

As shown in the equation (7) or (8), as the current $I_{OUT}$ flowing through the load L is lowered and the difference detection signal COMP is lowered, the switching period $T_{SW}$ is prolonged and the switching frequency is lowered. Thereby, it is possible to reduce the switching loss occurring in the switching element 2, thereby further lowering the power consumption at the light load.

As described above, the switching power-supply device 1 detects the light load, based on the current detection signal VTRIP, thereby lowering the voltage $V_{OUT}$ of the power-supply output. Thereby, it is possible to reduce the power that is consumed at the load L.

The switching power-supply device 1 detects the light load, based on the current detection signal VTRIP, and the current detection signal VTRIP is an internal signal of the control circuit 3. Therefore, a cable or connector transmitting a signal between the output circuit 4 and the control circuit 3 is not necessary. Thereby, it is possible to suppress the increase in the number of parts.

Also, the switching power-supply device 1 uses the switching element for sense 30 provided in parallel with the switching element 2 and the resistance 31 connected in series with the switching element for sense 30 and generates the current detection signal VTRIP based on the voltage drop of the resistance 31, so that it is easy to extremely reduce a size of the switching element for sense 30, as compared to a size of the switching element 2. Accordingly, it is possible to suppress the current flowing through the resistance 31 so that it is extremely small, thereby suppressing the power consumption by the resistance 31.

Figure 6:
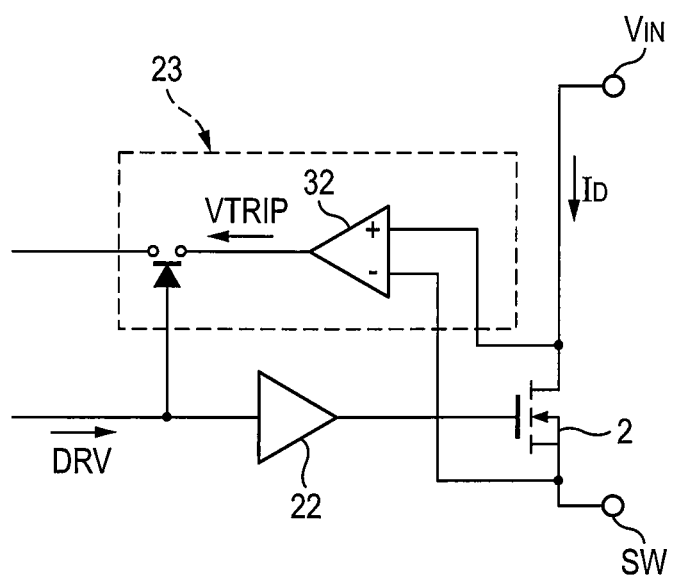
FIG. 6 is a block diagram of a modified embodiment of the first load detection circuit shown in FIG. 2.

Meanwhile, in the current detection circuit 23, the current detection signal VTRIP is generated based on the voltage drop of the resistance 31 that is connected in series with the switching element for sense 30. However, instead of this configuration, the current detection signal VTRIP may be generated based on a voltage drop by an on-resistance of the switching element 2, as shown in FIG. 6.

Figure 7:
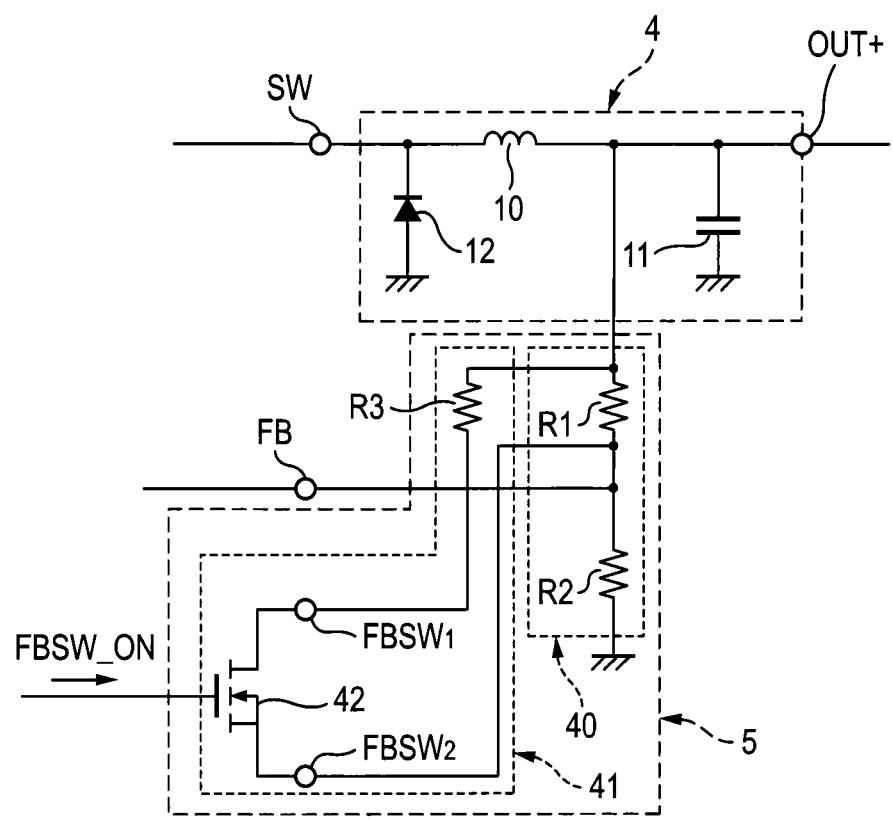
FIG. 7 is a block diagram of a modified embodiment of a feedback signal generation circuit of the switching power-supply device shown in FIG. 1.

Also, in the feedback signal generation circuit 5, the correction circuit 41 configured by the corrosion resistance R3 and the switch 42 is provided in parallel with the resistance R2 of the voltage-dividing circuit 40. However, as shown in FIG. 7, the correction circuit 41 may be provided in parallel with the resistance R1 of the voltage-dividing circuit 40. In this case, the voltage-dividing ratio of the voltage $V_{OUT}$ of the power-supply output is relatively increased at the state where the switch 42 is being on. Therefore, the first load detection circuit 26 is configured to turn off the switch 42 at the heavy load and to turn on the switch 42 at the light load.

Figure 8:
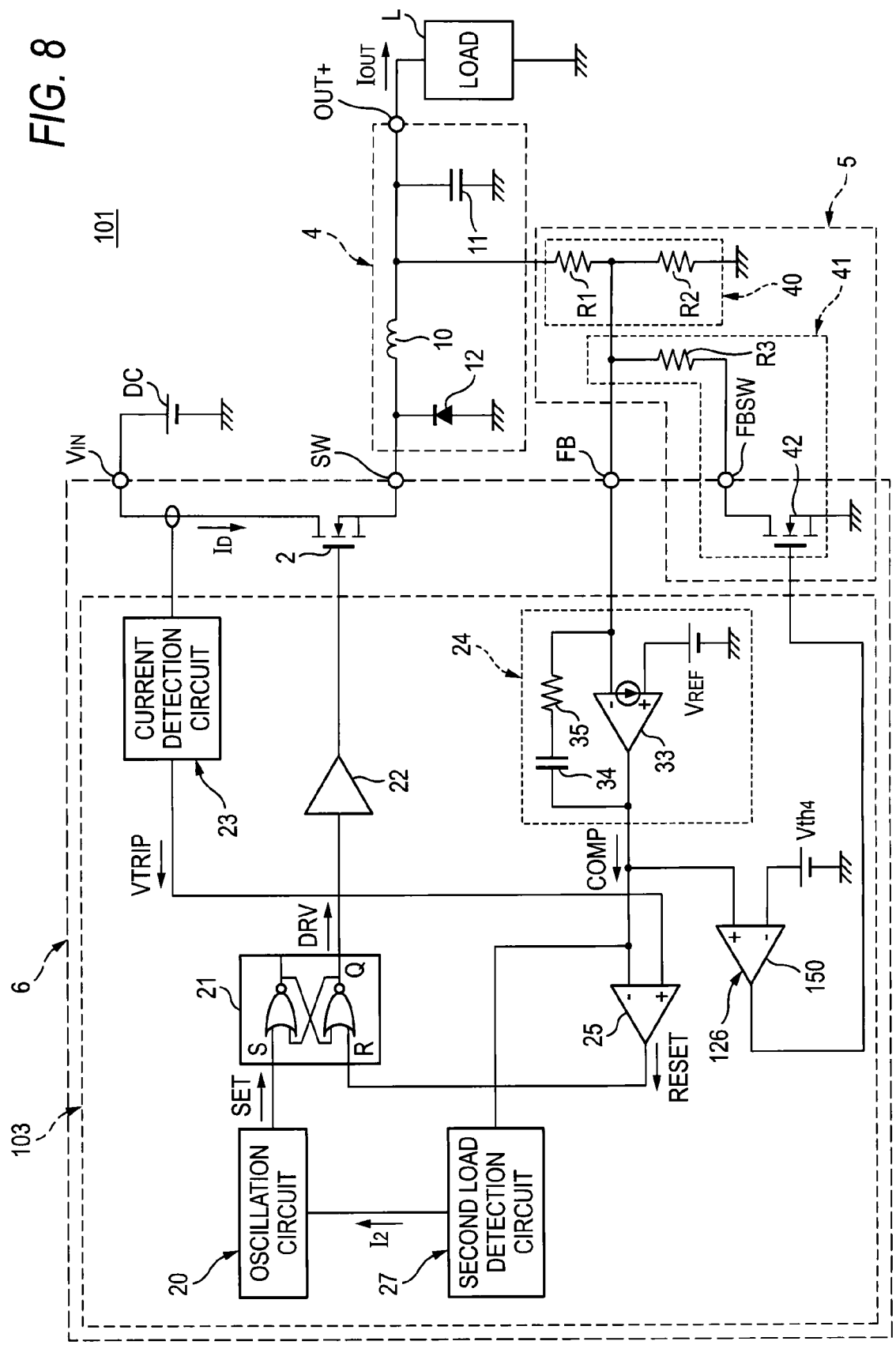
FIG. 8 is a block diagram illustrating another example of a configuration of a switching power-supply device for illustrating an exemplary illustrative embodiment.

FIG. 8 illustrates another example of a configuration of a switching power-supply device for illustrating an exemplary illustrative embodiment. In the meantime, the common elements to the switching power-supply device 1 are denoted with the same reference numerals and the descriptions thereof are omitted or simplified.

A switching power-supply device 101 shown in FIG. 8 is different from the switching power-supply device 1, in that the light load is detected based on the difference detection signal COMP output from the difference detection circuit 24 and thus the voltage $V_{OUT}$ of the power-supply output is lowered.

In a control circuit 103, a first load detection circuit 126 that detects the light load to lower the voltage $V_{OUT}$ of the power-supply output includes a load detection comparator 150. An inverting input terminal of the load detection comparator 150 is input with the difference detection signal COMP that is output from the difference detection circuit 24. Also, a non-inverting input terminal of the load detection comparator 150 is applied with a fourth threshold voltage $V_{th4}$. The load detection comparator 150 compares the difference detection signal COMP and the fourth threshold voltage $V_{th4}$ and outputs a driving signal FBSW_ON of a HIGH level or LOW level to the correction circuit 41 to thus drive the gate of the switch 42.

At the heavy load where the current $I_{OUT}$ of the power-supply output is relatively high, the difference detection signal COMP exceeds the fourth threshold voltage $V_{th4}$, the driving signal FBSW_ON that is output from the load detection comparator 150 becomes a HIGH level, and the switch 42 of the correction circuit 41 turns on. In the meantime, when the current $I_{OUT}$ of the power-supply output of the output circuit 4 decreases and the difference detection signal COMP becomes smaller than the fourth threshold voltage $V_{th4}$, the driving signal FBSW_ON that is output from the load detection comparator 150 is switched from the HIGH level to a LOW level, and the switch 42 of the correction circuit 41 turns off.

At the light load where the switch 42 is being off, as compared to the heavy load where the switch 42 is being off, the voltage-dividing ratio of the voltage $V_{OUT}$ of the power-supply output is increased, the signal level of the feedback signal $V_{FB}$ is boosted, and the voltage $V_{OUT}$ of the power-supply output is lowered.

Like this, it is possible to detect the light load, based on the difference detection signal COMP instead of the current detection signal VTRIP, and to lower the voltage $V_{OUT}$ of the power-supply output. Also in this case, it is possible to reduce the power that is consumed at the load L. Since the difference detection signal COMP is also an internal signal of the control circuit 103, like the current detection signal VTRIP, a cable or connector transmitting a signal between the output circuit 4 and the control circuit 3 is not necessary. Thereby, it is possible to suppress the increase in the number of parts.

Also in the switching power-supply device 101, the correction circuit 41 may be provided in parallel with the resistance R1 of the voltage-dividing circuit 40, similarly to the switching power-supply device 1.

Figure 9:
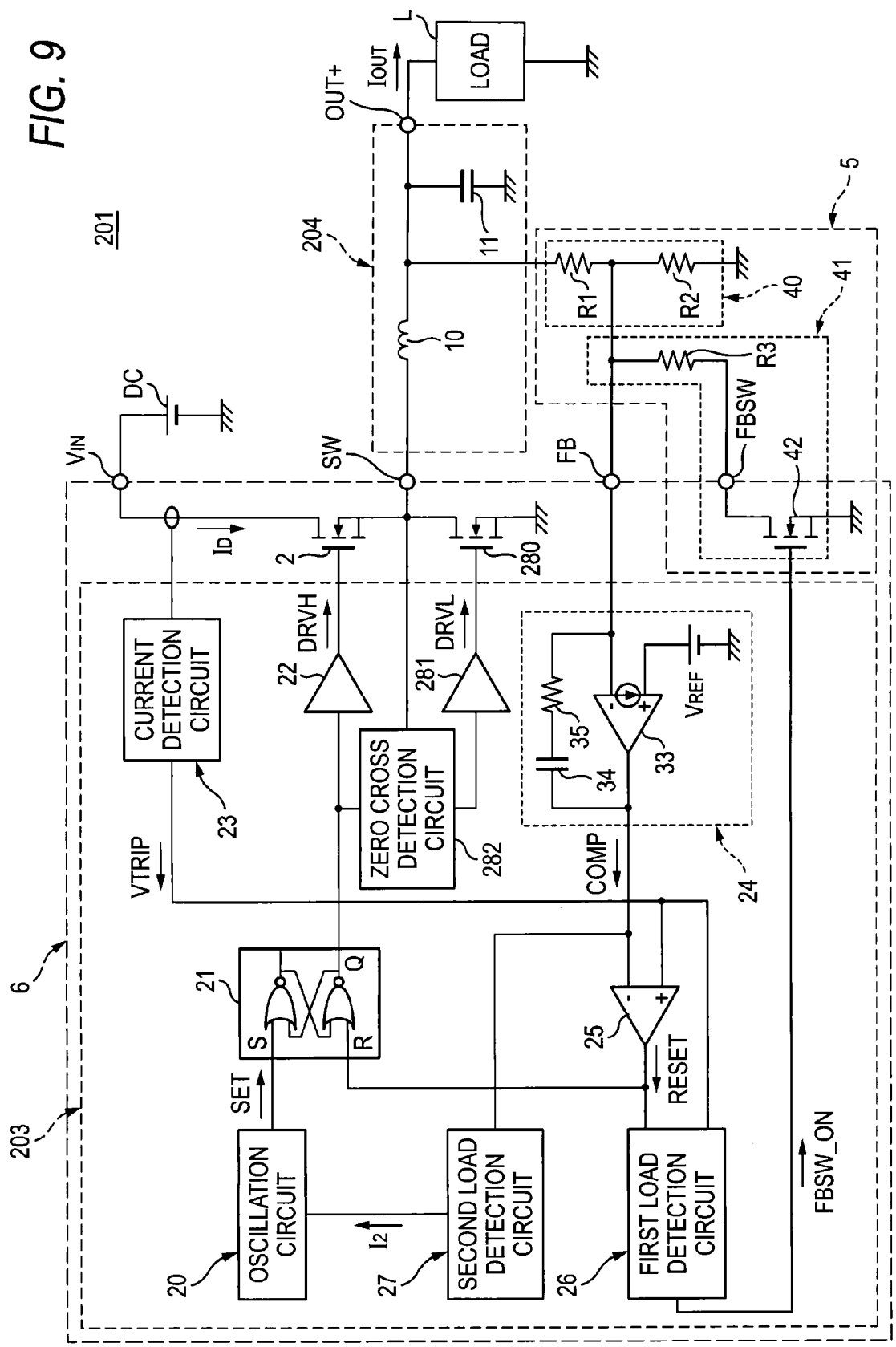
FIG. 9 is a block diagram illustrating another example of a configuration of a switching power-supply device for illustrating an exemplary illustrative embodiment.
Figure 10:
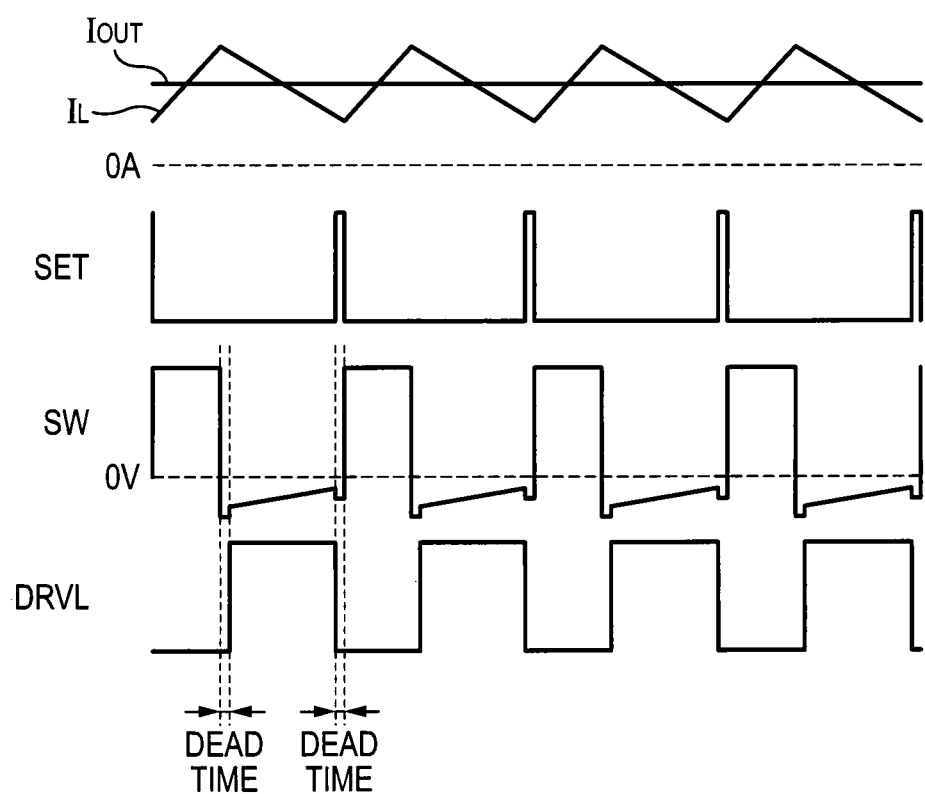
FIG. 10 is a waveform diagram illustrating an example of operations of respective units of the switching power-supply device shown in FIG. 9.
Figure 11:
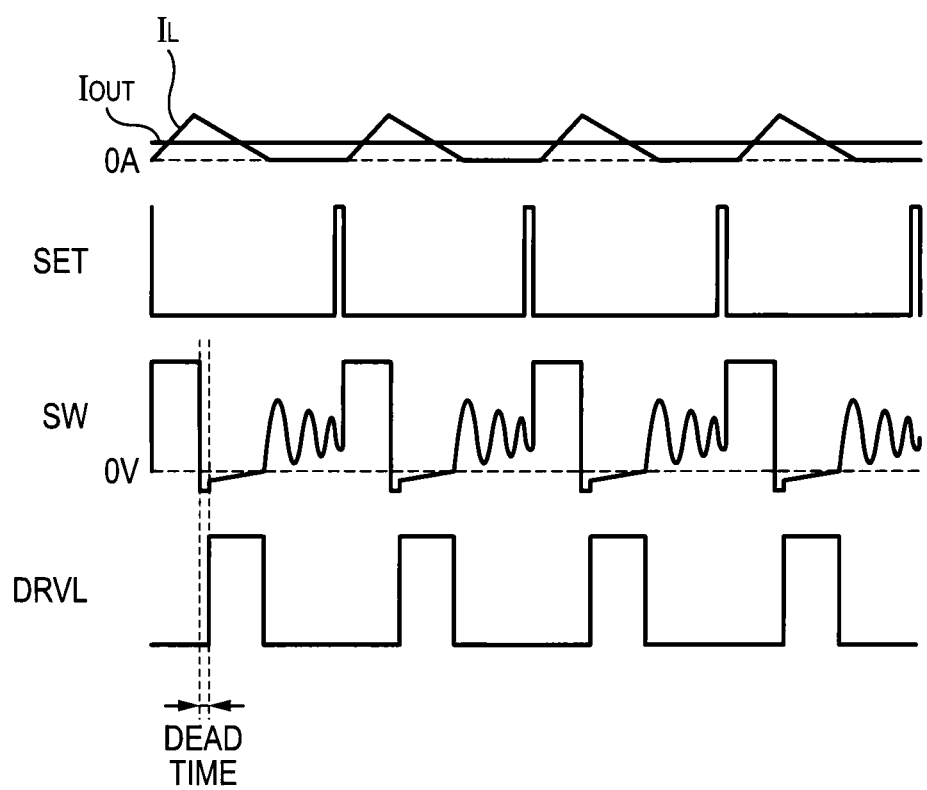
FIG. 11 is a waveform diagram illustrating an example of operations of respective units of the switching power-supply device shown in FIG. 9.

FIG. 9 is a block diagram illustrating a configuration of another example of a switching power-supply device for illustrating an exemplary illustrative embodiment and FIGS. 10 and 11 illustrates operations of respective units of the switching power-supply device of FIG. 9. In the meantime, the common elements to the switching power-supply device 1 are denoted with the same reference numerals and the descriptions thereof will be omitted or simplified.

A switching power-supply device 201 shown in FIG. 9 is a so-called synchronous rectification type switching power-supply device and is different from the switching power-supply device 1 in that an output circuit 204 is not provided with a diode and a control circuit 203 is further provided with a low-side switching element 280, which is an n-channel MOSFET, a low-side drive circuit 281 of the low-side switching element 280 and a zero cross detection circuit 282 detecting timing at which a regenerative time period of the inductor 10 of the output circuit 204 is over.

As shown in FIG. 10, when current $I_L$ flowing through the inductor 10 of the output circuit 204 at the heavy load is continuous, the high-side switching element 2 turns off and then the low-side switching element 280 turns on by a low-side drive signal DRVL that is output from the low-side drive circuit 280. The regenerative current $I_L$ of the inductor 10 flows from a source of the low-side switching element 280 towards a drain. After that, when the set signal SET that is output from the oscillation circuit 20 is switched from a LOW level to a HIGH level, the low-side switching element 280 turns off and the high-side switching element 2 turns on. Thereby, the state where the current $I_L$ flowing through the inductor 10 is continuous is kept.

Meanwhile, as shown in FIG. 11, when the current $I_L$ flowing through the inductor 10 of the output circuit 204 at the light load is discontinuous, the high-side switching element 2 turns on and then the low-side switching element 280 turns off. After that, when the zero cross detection circuit 282 detects timing at which the regenerative time period of the inductor 10 is over, based on a change in the voltage of the SW terminal of the control circuit 203, the low-side switching element 280 turns off.

In general, the low-side switching element 280 has a smaller forward voltage drop, as compared to a diode, and is used as a rectification element, instead of the diode. Therefore, it is possible to reduce the power loss that occurs in the rectification element during the regenerative time period of the inductor 10. The conversion of the power-supply output into the low voltage at the light load and the operation of lowering the switching frequency can synergistically further reduce the power consumption.

In the meantime, the synchronous rectification configuration using the low-side switching element 280, the drive circuit 281 and the zero cross detection circuit 282 can be also applied to the switching power-supply device 101.

As described above, the specification discloses following matters.

(1) A switching power-supply device comprises: a switching element to which direct current power is input; an output circuit that generates a power-supply output of direct current to be supplied to a load from power that is transmitted according to a switching operation of the switching element; a feedback signal generation circuit that generates a feedback signal from a voltage of the power-supply output; and a control circuit that drives the switching element, based on the feedback signal, and controls the voltage of the power-supply output, wherein the feedback signal generation circuit comprises a correction circuit that corrects a signal level of the feedback signal, wherein the control circuit comprises: an oscillation circuit that generates an on-trigger signal to turn on the switching element; a current detection circuit that generates a current detection signal according to a current flowing through the switching element; an difference detection circuit that generates an difference detection signal according to an difference between the feedback signal and a reference voltage; a comparison circuit that generates an off-trigger signal to turn off the switching element, based on the current detection signal and the difference detection signal; and a first load detection circuit that controls an operation of the correction circuit, based on the current detection signal, wherein the control circuit changes a setting voltage of the power-supply output, according to the signal level of the feedback signal.

(2) In the switching power-supply device of the above (1), the feedback signal generation circuit comprises a voltage-dividing circuit that is provided between a positive output terminal of the output circuit and a ground and that divides the voltage of the power-supply output to thus generate the feedback signal, wherein the correction circuit comprises a correction resistance and a switch that are provided in parallel with a voltage-dividing resistance at any one side of an output point of the feedback signal of the voltage-dividing circuit and that are connected in series with each other, and wherein the first load detection circuit controls the operation of the correction circuit by turning on-off the switch.

(3) In the switching power-supply device of the above (2), the correction resistance and the switch are provided between the output point of the feedback signal of the voltage-dividing circuit and the ground, wherein the first load detection circuit compares the current detection signal and a first threshold voltage, and wherein when the current detection signal is smaller than the first threshold voltage, the first load detection circuit turns off the switch, so that the control circuit changes the setting voltage of the power-supply output from a first voltage to a second voltage lower than the first voltage.

(4) In the switching power-supply device of the above (2), the correction resistance and the switch are provided between the output point of the feedback signal of the voltage-dividing circuit and the positive output terminal of the output circuit, wherein the first load detection circuit compares the current detection signal and a first threshold voltage, and wherein when the current detection signal is smaller than the first threshold voltage, the first load detection circuit turns on the switch, so that the control circuit changes the setting voltage of the power-supply output from a first voltage to a second voltage lower than the first voltage.

(5) In the switching power-supply device of the above (2), the control circuit is configured by an integrated circuit, and the switch is integrated into the same package as the control circuit.

(6) In the switching power-supply device of the above (1), the control circuit further comprise a second load detection circuit that compares the difference detection signal and a second threshold voltage and generates, when the difference detection signal is smaller than the second threshold voltage, a frequency control signal, which is proportional to a differential voltage between the difference detection signal and the second threshold voltage, and wherein the oscillation circuit changes a frequency of the on-trigger signal, based on the frequency control signal.

(7) In the switching power-supply device of the above (6), the oscillation circuit comprises: a current mirror circuit having a first transistor whose output terminal is connected to a constant current source and a second transistor that forms a pair together with the first transistor and outputs a mirror current; a capacitor that is connected to an output terminal of the second transistor; a comparator that compares a voltage between both ends of the capacitor and a third threshold voltage to thus output the on-trigger signal; and a discharging circuit that discharges the capacitor in conjunction with the output of the on-trigger signal, and wherein the frequency control signal is input to the output terminal of the first transistor.

(8) A switching power-supply device comprises: a switching element to which direct current power is input; an output circuit that generates a power-supply output of direct current to be supplied to a load from power that is transmitted according to a switching operation of the switching element; a feedback signal generation circuit that generates a feedback signal from a voltage of the power-supply output, and a control circuit that drives the switching element, based on the feedback signal, and controls the voltage of the power-supply output, wherein the feedback signal generation circuit comprises a correction circuit that corrects a signal level of the feedback signal, wherein the control circuit comprises: an oscillation circuit that generates an on-trigger signal to turn on the switching element; a current detection circuit that generates a current detection signal according to a current flowing to the switching element; an difference detection circuit that generates an difference detection signal according to an difference between the feedback signal and a reference voltage; a comparison circuit that generates an off-trigger signal to turn off the switching element, based on the current detection signal and the difference detection signal; and a first load detection circuit that controls an operation of the correction circuit, based on the difference detection signal, and wherein the control circuit changes a setting voltage of the power-supply output, according to the signal level of the feedback signal.

(9) In the switching power-supply device of the above (8), the feedback signal generation circuit comprises a voltage-dividing circuit that is provided between a positive output terminal of the output circuit and a ground and that divides the voltage of the power-supply output to thus generate the feedback signal, wherein the correction circuit comprises a correction resistance and a switch that are provided in parallel with a voltage-dividing resistance at any one side of an output point of the feedback signal of the voltage-dividing circuit and that are connected in series with each other, and wherein the first load detection circuit controls the operation of the correction circuit by turning on-off the switch.

(10) In the switching power-supply device of the above (9), the correction resistance and the switch are provided between the output point of the feedback signal of the voltage-dividing circuit and the ground, wherein the first load detection circuit compares the difference detection signal and a first threshold voltage, and wherein when the difference detection signal is smaller than the first threshold voltage, the first load detection circuit turns off the switch, so that the control circuit changes the setting voltage of the power-supply output from a first voltage to a second voltage lower than the first voltage.

(11) In the switching power-supply device of the above (9), the correction resistance and the switch are provided between the output point of the feedback signal of the voltage-dividing circuit and the positive output terminal of the output circuit, wherein the first load detection circuit compares the difference detection signal and a first threshold voltage, and wherein when the difference detection signal is smaller than the first threshold voltage, the first load detection circuit turns on the switch, so that the control circuit changes the setting voltage of the power-supply output from a first voltage to a second voltage lower than the first voltage.

(12) In the switching power-supply device of the above (9), the control circuit is configured by an integrated circuit, and the switch is integrated into the same package as the control circuit.

(13) In the switching power-supply device of the above (8), the control circuit further comprise a second load detection circuit that compares the difference detection signal and a reference voltage and generates, when the difference detection signal is smaller than the second threshold voltage, a frequency control signal, which is proportional to a differential voltage between the difference detection signal and the second threshold voltage, and the oscillation circuit changes a frequency of the on-trigger signal, based on the frequency control signal.

(14) In the switching power-supply device of the above (13), the oscillation circuit comprises: a current mirror circuit having a first transistor whose output terminal is connected to a constant current source and a second transistor that forms a pair together with the first transistor and outputs a mirror current; a capacitor that is connected to an output terminal of the second transistor, a comparator that compares a voltage between both ends of the capacitor and a third threshold voltage to thus outputs the on-trigger signal; and a discharging circuit that discharges the capacitor in conjunction with the output of the on-trigger signal, and wherein the frequency control signal is input to the output terminal of the first transistor.

(15) A method of controlling a switching power-supply device that generates a power-supply output of direct current from power of direct current, which is input to a switching element according to a switching operation of the switching element, and that drives the switching element, based on a feedback signal that is generated from a voltage of the power-supply output, to thus control a voltage of the power-supply output, the method comprises: correcting a signal level of the feedback signal, based one of on an difference between a current flowing through the switching element and the feedback signal and a reference voltage, and changing a setting voltage of the power-supply output according to the signal level of the feedback signal.

(16) The method of controlling a switching power-supply device of the above (15) further comprises: dividing a voltage of the power-supply output to generate the feedback signal; and changing a voltage-dividing ratio to correct the signal level of the feedback signal.

(17) The method of controlling a switching power-supply device of the above (16) further comprises comparing a voltage signal, which corresponds to one of the difference between the current flowing through the switching element and the feedback signal and the reference voltage, and a first threshold voltage; and increasing, when the voltage signal is lower than the first threshold voltage, a voltage-dividing ratio of the power-supply output generating the feedback signal, so that the setting voltage of the power-supply output is changed from a first voltage to a second voltage lower than the first voltage.

(18) The method of controlling a switching power-supply device of the above (15) further comprises changing a switching frequency of the switching element, based on the difference between the feedback signal and the reference voltage.

What is claimed is:

1. A switching power-supply device comprising:
   a switching element to which direct current power is input;
   an output circuit that generates a power-supply output of direct current, to be supplied to a load, from power that is transmitted according to a switching operation of the switching element;
   a feedback signal generation circuit that generates a feedback signal from a voltage of the power-supply output; and
   a control circuit that drives the switching element, based on the feedback signal, and controls the voltage of the power-supply output,
   wherein the feedback signal generation circuit comprises a correction circuit that corrects a signal level of the feedback signal,
   wherein the control circuit comprises:
   an oscillation circuit that generates an on-trigger signal to turn on the switching element;
   a current detection circuit that generates a current detection signal according to a current flowing through the switching element;
   a difference detection circuit that generates a difference detection signal according to a difference between the feedback signal and a reference voltage;
   a comparison circuit that generates an off-trigger signal to turn off the switching element, based on the current detection signal and the difference detection signal; and a first load detection circuit that controls an operation of the correction circuit, based on the current detection signal, and wherein the control circuit changes a setting voltage of the power-supply output, according to the signal level of the feedback signal.

2. The switching power-supply device according to claim 1, wherein the feedback signal generation circuit comprises a voltage-dividing circuit that is provided between a positive output terminal of the output circuit and a ground, the voltage-dividing circuit also being configured to divide the voltage of the power-supply output to generate the feedback signal, wherein the correction circuit comprises a correction resistance and a switch, the correction resistance and the switch being provided in parallel with a voltage-dividing resistance at any one side of an output point of the feedback signal of the voltage-dividing circuit, and being connected in series with each other, and wherein the first load detection circuit controls the operation of the correction circuit by turning on-off the switch.

3. The switching power-supply device according to claim 2, wherein the correction resistance and the switch are provided between the output point of the feedback signal of the voltage-dividing circuit and a ground, wherein the first load detection circuit compares the current detection signal and a first threshold voltage, and wherein when the current detection signal is smaller than the first threshold voltage, the first load detection circuit turns off the switch, so that the control circuit changes the setting voltage of the power-supply output from a first voltage to a second voltage lower than the first voltage.

4. The switching power-supply device according to claim 2, wherein the correction resistance and the switch are provided between the output point of the feedback signal of the voltage-dividing circuit and the positive output terminal of the output circuit, wherein the first load detection circuit compares the current detection signal and a first threshold voltage, and wherein when the current detection signal is smaller than the first threshold voltage, the first load detection circuit turns on the switch, so that the control circuit changes the setting voltage of the power-supply output from a first voltage to a second voltage lower than the first voltage.

5. The switching power-supply device according to claim 2, wherein the control circuit is configured by an integrated circuit, and the switch is integrated into the same package as the control circuit.

6. The switching power-supply device according to claim 1, wherein the control circuit further comprises a second load detection circuit that compares the difference detection signal and a second threshold voltage and generates, when the difference detection signal is smaller than the second threshold voltage, a frequency control signal, which is proportional to a differential voltage between the difference detection signal and the second threshold voltage, and wherein the oscillation circuit changes a frequency of the on-trigger signal, based on the frequency control signal.

7. The switching power-supply device according to claim 6, wherein the oscillation circuit comprises:

a current mirror circuit having a first transistor whose output terminal is connected to a constant current source and a second transistor that forms a pair together with the first transistor and outputs a mirror current;

a capacitor that is connected to an output terminal of the second transistor;

a comparator that compares a voltage between both ends of the capacitor and a third threshold voltage to output the on-trigger signal; and a discharging circuit that discharges the capacitor in conjunction with the output of the on-trigger signal, and wherein the frequency control signal is input to the output terminal of the first transistor.

8. A switching power-supply device comprising:

a switching element to which direct current power is input;

an output circuit that generates a power-supply output of direct current, to be supplied to a load, from power that is transmitted according to a switching operation of the switching element;

a feedback signal generation circuit that generates a feedback signal from a voltage of the power-supply output, and a control circuit that drives the switching element, based on the feedback signal, and controls the voltage of the power-supply output, wherein the feedback signal generation circuit comprises a correction circuit that corrects a signal level of the feedback signal, wherein the control circuit comprises:

an oscillation circuit that generates an on-trigger signal to turn on the switching element;

a current detection circuit that generates a current detection signal according to a current flowing to the switching element;

a difference detection circuit that generates a difference detection signal according to a difference between the feedback signal and a reference voltage;

a comparison circuit that generates an off-trigger signal to turn off the switching element, based on the current detection signal and the difference detection signal; and a first load detection circuit that controls an operation of the correction circuit, based on the difference detection signal, and wherein the control circuit changes a setting voltage of the power-supply output, according to the signal level of the feedback signal.

9. The switching power-supply device according to claim 8, wherein the feedback signal generation circuit comprises a voltage-dividing circuit that is provided between a positive output terminal of the output circuit and a ground, the voltage-dividing circuit being further configured to divide the voltage of the power-supply output to generate the feedback signal, wherein the correction circuit comprises a correction resistance and a switch, the correction resistance and the switch being provided in parallel with a voltage-dividing resistance at any one side of an output point of the feedback signal of the voltage-dividing circuit, and being connected in series with each other, and wherein the first load detection circuit controls the operation of the correction circuit by turning on-off the switch.

10. The switching power-supply device according to claim 9,
wherein the correction resistance and the switch are provided between the output point of the feedback signal of the voltage-dividing circuit and a ground,
wherein the first load detection circuit compares the difference detection signal and a first threshold voltage, and
wherein when the difference detection signal is smaller than the first threshold voltage, the first load detection circuit turns off the switch, so that the control circuit changes the setting voltage of the power-supply output from a first voltage to a second voltage lower than the first voltage.

11. The switching power-supply device according to claim 9,
wherein the correction resistance and the switch are provided between the output point of the feedback signal of the voltage-dividing circuit and the positive output terminal of the output circuit,
wherein the first load detection circuit compares the difference detection signal and a first threshold voltage, and
wherein when the difference detection signal is smaller than the first threshold voltage, the first load detection circuit turns on the switch, so that the control circuit changes the setting voltage of the power-supply output from a first voltage to a second voltage lower than the first voltage.

12. The switching power-supply device according to claim 9,
wherein the control circuit is configured by an integrated circuit, and the switch is integrated into the same package as the control circuit.

13. The switching power-supply device according to claim 8,
wherein the control circuit further comprises a second load detection circuit that compares the difference detection signal and a reference voltage and generates, when the difference detection signal is smaller than a second threshold voltage, a frequency control signal, which is proportional to a differential voltage between the difference detection signal and the second threshold voltage, and
wherein the oscillation circuit changes a frequency of the on-trigger signal, based on the frequency control signal.

14. The switching power-supply device according to claim 13,
wherein the oscillation circuit comprises:
a current mirror circuit having a first transistor whose output terminal is connected to a constant current source and a second transistor that forms a pair together with the first transistor and outputs a mirror current;
a capacitor that is connected to an output terminal of the second transistor, a comparator that compares a voltage between both ends of the capacitor and a third threshold voltage to outputs the on-trigger signal; and
a discharging circuit that discharges the capacitor in conjunction with the output of the on-trigger signal, and
wherein the frequency control signal is input to the output terminal of the first transistor.

15. A method of controlling a switching power-supply device that generates a power-supply output of direct current from power of direct current, which is input to a switching element according to a switching operation of the switching element, and that drives the switching element, based on a feedback signal that is generated from a voltage of the power-supply output, to control a voltage of the power-supply output, the method comprising:
generating an off-trigger signal to turn off the switching element, based on a current flowing through the switching element, and a difference between the feedback signal and a reference voltage;
correcting a signal level of the feedback signal, based on one of the current flowing through the switching element, and the difference between the feedback signal and the reference voltage, and
changing a setting voltage of the power-supply output according to the signal level of the feedback signal.

16. The method of controlling the switching power-supply device according to claim 15 further comprising:
dividing a voltage of the power-supply output to generate the feedback signal; and
changing a voltage-dividing ratio to correct the signal level of the feedback signal.

17. The method of controlling the switching power-supply device according to claim 16 further comprising:
comparing a voltage signal, which corresponds to one of the difference between the current flowing through the switching element and the feedback signal and the reference voltage, and a first threshold voltage; and
increasing, when the voltage signal is lower than the first threshold voltage, a voltage-dividing ratio of the power-supply output generating the feedback signal, so that the setting voltage of the power-supply output is changed from a first voltage to a second voltage lower than the first voltage.

18. The method of controlling the switching power-supply device according to claim 15 further comprising
changing a switching frequency of the switching element, based on the difference between the feedback signal and the reference voltage.

* * * * *